United States Patent [11] 3,625,951

| | | | |
|---|---|---|---|
| [72] | Inventor | Tony Cebalo |
| | | Indianapolis, Ind. |
| [21] | Appl. No. | 101,180 |
| [22] | Filed | Dec. 23, 1970 |
| [45] | Patented | Dec. 7, 1971 |
| [73] | Assignee | Air Products and Chemicals, Inc. |
| | | Allentown, Pa. |
| | | Continuation-in-part of application Ser. No. 32,715, Apr. 28, 1970, which is a continuation-in-part of application Ser. No. 835,221, June 20, 1969. This application Dec. 23, 1970, Ser. No. 101,180 |

[54] PREPARATION OF 3,4-DISUBSTITUTED-DELTA-2-1,2,-TRIAZOLINE-5-THIONES
9 Claims, No Drawings

[52] U.S. Cl.......................................................... 260/308 A,
260/308 C
[51] Int. Cl........................................................ C07d 55/06
[50] Field of Search............................................ 260/308 R,
308 C

[56] References Cited
FOREIGN PATENTS
776,118  6/1957  Great Britain................  260/294.8

OTHER REFERENCES
Elderfield, Heterocyclic Compounds, Vol. 7, (New York, 1961), pages 428– 433. (Scientific Library)
Freund, Ber. Deut. Chemc., Vol. 29, pages 2483– 2490 (1896). (Chem. Library)

*Primary Examiner*—Alton D. Rollins
*Attorney*—McLean, Boustead & Sayre

ABSTRACT: The invention relates to the method of synthesis of certain 3,4-disubstituted-$\Delta^2$-1,2,4-triazoline-5-thiones by reacting the appropriate alkylthiosemicarbazide with certain fluoroalkylcarboxylic acids. The reaction in its preferred embodiment is carried out by azeotropic distillation of byproduct water.

PREPARATION OF 3,4-DISUBSTITUTED-DELTA-2-1,2,-TRIAZOLINE-5-THIONES

This is a continuation-in-part of application Ser. No. 32,715, filed Apr. 28, 1970, which is a continuation-in-part of Ser. No. 835,221, filed June 20, 1969.

BACKGROUND OF THE INVENTION

1. Field of the Invention

This invention relates to a novel one-step condensation process for the preparation of 3,4-disubstituted $\Delta^2$-1,2,4-triazoline-5-thiones, and tautomers thereof, by reacting alkylthiosemicarbazide and a fluoroalkylcarboxylic acid. These compounds are useful intermediates for the preparation of agriculturally useful phosphate derivatives thereof in accordance with said copending application, Ser. No. 32715.

2. Description of the Prior Art

British Pat. No. 776,118, involving a rather cumbersome and uneconomical ring closure of acylated thiosemicarbazides of the following general structure,

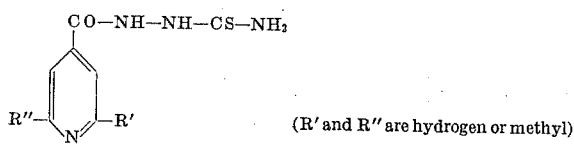

(R' and R" are hydrogen or methyl)

is illustrative of the prior art methods for the synthesis of $\Delta^2$-1,2,4-triazoline-5-thiones. Ring closure is effected by refluxing the acylated thiosemicarbazide in high boiling solvents, such as tetrahydronaphthalene or cumene, for periods of 6 to 7 hours. Heating the reactants to a melt, that is in the absence of solvents, is also disclosed, as well as ring closure by the use of alkaline condensing agents as, for example, alkali metal alcoholates in alcohols. Preparation of the acylated thiosemicarbazide by reaction of an acid hydrazide with the corresponding thiocyanate is also disclosed.

Because economics play such an important roll in commercial development of pesticidally active compounds, a more simple and economical one-step process for the production of the $\Delta^2$-1,2,4-triazoline-5-thione intermediates of this invention than has previously been available is needed. It has now been found that condensation of fluoroalkylcarboxylic acids with an alkylthiosemicarbazide provides such a simple, straight-forward process. It has also been found that such a reaction can simply be carried out by azeotropic distillation of the water formed utilizing an inert organic solvent, more fully described hereafter.

SUMMARY OF THE INVENTION

In accordance with this invention there is provided a process for the preparation of 3-fluoroalkyl-4-alkyl-$\Delta^2$-1,2,4,-triazoline-5-thiones and the corresponding 3-fluoroalkyl-4-alkyl-1,2,4-triazoline-5-thiol tautomers thereof of the formula

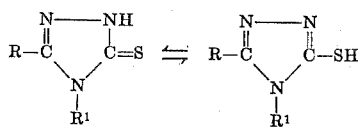

wherein R represents fluoroalkyl having from one to seven carbon atoms, (i.e., lower-alkyl) and $R^1$ represents lower-alkyl having from one to seven carbon atoms. The process comprises reacting a fluoroalkylcarboxylic acid e.g., of the formula RCOOH, wherein R has the above meaning, with an alkylthiosemicarbazide of the formula

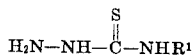

wherein $R^1$ has the above meaning. The reaction is simply carried out by azeotropic distillation of the water formed during condensation, using an inert organic solvent such as benzene, toluene, or m-xylene.

DETAILED DESCRIPTION OF THE INVENTION

The process of this invention is further demonstrated by the following reaction sequence:

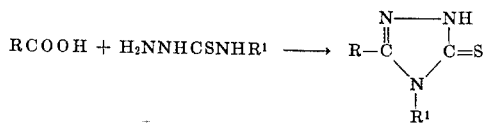

and tautomers thereof, wherein R and $R^1$ are as defined previously, and preferably, wherein R represents a mono- or polyfluorinated lower-alkyl of from one to seven carbon atoms, which can be additionally substituted, preferably by chloro groups, and wherein the alkyl is exemplified by methyl, ethyl, propyl, i-propyl, butyl, i-butyl, s-butyl, t-butyl, pentyl (and the branched isomers thereof), hexyl (and the branched isomers thereof), and heptyl (and the branched isomers thereof). Exemplary of such fluorolower-alkyls are $CF_3$, $F_2CH$, $C_2F_5$, $ClF_2C$, $CH_3CHCF_3CH_2$, $(CH_2)_3CF_3$, $(CH_2)_2CF_3$, $CH_2CCl_2CF_3$. $R^1$ represents lower-alkyl of from one to seven carbon atoms such as methyl, ethyl, propyl, i-propyl, butyl, i-butyl, s-butyl, t-butyl, pentyl (and the branched isomers thereof), hexyl (and the branched isomers thereof), and heptyl (and the branched isomers thereof).

The reaction is carried out in an inert organic solvent which forms an azeotropic mixture with water such as benzene, toluene, or m-xylene. The inert organic solvent is an "entrainer," that is a liquid which forms with water a heterogeneous binary azeotrope having a different (and preferably lower) boiling point from any other component of the reaction mixture. Exemplary of such azeotropes are those set forth in the Handbook of Chemistry and Physics, 46th Edition, published by the Chemical Rubber Co., pages D-1-21. Separation systems for azeotropic distillation are well known. See, for example, Kirk-Othmer Encyclopedia of Chemical Technology, Second Edition, pages 847-849.

The reaction is carried out by azeotropic distillation of the water formed during the condensation reaction. Therefore, the reaction is conducted at refluxing temperatures.

The reaction is carried out for a period of time sufficient for all the water formed to be removed by azeotropic distillation. Generally the reaction is completed within 2 to 3 hours.

From about a stoichiometric quantity up to a slight excess of fluoroalkylcarboxylic acid per mole of alkyl thiosemicarbazide is preferred (e.g., 1.01-1.5:1). Proportions outside these ranges can be employed, but are less economical.

The following examples further illustrate the process of this invention.

EXAMPLE 1

4-Methyl-3-trifluoromethyl-$\Delta^2$-1,2,4-triazoline-5-thione

To a cooled, well stirred suspension of 4-methyl-thiosemicarbazide (105 g.) in toluene (400 cc.) was added trifluoroacetic acid while the temperature was maintained below 40° C. Next the reaction mixture was brought to reflux temperature and the water formed was removed by means of a Dean-Stark trap. The refluxing was continued until approximately 36 g. of water had been removed. Next the reaction mixture was cooled to ca.−10° C. and the desired product, 4-methyl-3-trifluoromethyl-$\Delta^2$-1,2,4-triazoline-5-thione, filtered off. This product on recrystallization from methylene chloride-petroleum ether had m.p. 119°–120° C.

EXAMPLE 2

3-Difluoromethyl-4-methyl-$\Delta^2$-1,2,4-triazoline-5-thione

Difluoroacetic acid (9.6 g.) was added dropwise at room temperature to a well stirred suspension of 4- methylthiosemicarbazide (10.5 g.) in toluene (100 ml.). After all the difluoroacetic acid was added, the reaction mixture was refluxed until all of the water formed had been removed by means of a Dean-Stark trap (3 hours). The reaction mixture was cooled and the insoluble material filtered off. The solid product was dissolved in ammonium hydroxide and then reprecipitated with 6N HCl to give the desired 3-difluoromethyl-4-methyl-$\Delta^2$-1,2,4-triazoline-5-thione which on crystallization from ethyl acetate had m.p. 171°–174° C.

EXAMPLE 2A

Ten and one-half grams of 4-methylthiosemicarbazide were placed into a solution containing 100 ml. of xylene and 10.6 g. of difluoroacetic acid and the resulting suspension refluxed under a Dean-Stark trap until water ceased to be obtained. The reaction mixture was cooled to about 12° C. and filtered to yield 13.5 g. of a product having a melting point of 171°–174° C. The resulting product was identified as 3-difluoromethyl-4-methyl-$\Delta^2$-1,2,4-triazoline-5-thione.

EXAMPLE 3

3-Chlorodifluoromethyl-4-methyl-$\Delta^2$-1,2,4-triazoline-5-thione

Chlorodifluoroacetic acid (54.6 g.) was added slowly and with stirring to a suspension of 4-methylthiosemicarbazide (40.0 g.) in toluene. Next the reaction mixture was refluxed until all the water formed was removed by means of a Dean-Stark trap. The reaction mixture was next concentrated to a small volume and the product, 3-chlorodifluoromethyl-4-methyl-$\Delta^2$1,2,4-triazoline-5-thione, filtered off. This compound had a melting point of 93°–95° C.

Halogenated carboxylic acids containing additional substituents are also operable in the process of this invention. Exemplary are those defined above containing additional substituents which do not interfere with the condensation of the acid and thiosemicarbazide. Exemplary of these substituents are: lower-cycloalkyl of from three to six carbons; heterocyclic of from five to six ring atoms, such as pyridyl or furyl; lower-alkoxy of one to four carbons; phenyl or phenyl substituted with such as halo, nitro, trifluoromethyl, lower-alkyl, lower-alkoxy, or cyano.

The fluoroalkyl carboxylic acids and alkylthiosemicarbazide reactants of this invention are available as articles of commerce or can be prepared by conventional and known procedures.

Employing the method substantially as described in examples 1–3, with variations of starting materials described in the following table I, there are produced the 3-fluoroalkyl-4-alkyl-$\Delta^2$-1,2,4-triazoline-5-thiones, also described in table I, according to the reaction scheme illustrated therein.

TABLE I

RCOOH + H$_2$NNHCSNHR$^1$ ⟶ 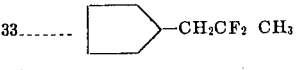

| Ex. No. | R | R$^1$ |
| --- | --- | --- |
| 4 | CF$_3$ | CH$_3$CH$_2$ |
| 5 | CF$_3$ | CH$_3$CH$_2$CH$_2$ |
| 6 | CF$_3$ | CH$_3$CHCH$_3$ |
| 7 | CF$_3$ | CH$_3$(CH$_2$)$_2$CH$_2$ |
| 8 | CF$_3$ | (CH$_3$)$_3$C |
| 9 | CF$_3$ | CH$_3$(CH$_2$)$_3$CH$_2$ |
| 10 | CF$_3$ | CH$_3$(CH$_2$)$_4$CH$_2$ |
| 11 | CF$_3$ | CH$_3$(CH$_2$)$_5$CH$_2$ |
| 12 | ClFCH | CH$_3$ |
| 13 | CF$_3$CF$_2$ | CH$_3$ |
| 14 | FCH$_2$CH$_2$ | CH$_3$ |
| 15 | ClF$_2$C | CH$_3$CH$_2$ |
| 16 | ClFCH | (CH$_3$)$_2$CHCH$_2$ |
| 17 | FCH$_2$CH$_2$ | Same as above. |
| 18 | Same as above | CH$_3$CH$_2$ |
| 19 | ClF$_2$C | CH$_3$(CH$_2$)$_4$CH$_2$ |
| 20 | CF$_3$CF$_2$ | i-C$_3$H$_7$ |
| 21 | CHF$_2$ | t-C$_4$H$_9$ |
| 22 | CF$_3$CF$_2$ | CH$_3$ |
| 23 | CF$_3$CF$_2$CF$_2$ | CH$_3$ |
| 24 | CF$_3$CF$_2$ | CH$_3$CH$_2$ |
| 25 | CF$_3$CF$_2$CF$_2$ | CH$_3$CH$_2$CH$_2$ |
| 26 | FCH$_2$CH$_2$ | i-C$_3$H$_7$ |
| 27 | CF$_3$CF$_2$CF$_2$ | CH$_3$CH$_2$ |
| 28 | FCH$_2$CH$_2$ | n-C$_4$H$_9$ |
| 29 | CF$_3$(CH$_2$)$_4$CH$_2$ | CH$_3$ |
| 30 | CH$_2$CCl$_2$CF$_3$ | CH$_3$ |
| 31 | CCl$_2$F | CH$_3$ |
| 32 | C$_6$H$_5$CHF | CH$_3$ |
| 33 | 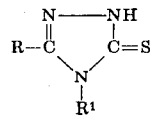—CH$_2$CF$_2$ | CH$_3$ |
| 34 | CH$_3$\CHCH$_2$ / CF$_3$ | CH$_3$ |

I claim:

1. A process for the preparation of 3-fluoroalkyl-4-alkyl-$\Delta^2$-triazoline-5-thiones and tautomers thereof of the formula:

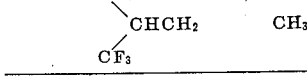

wherein R is a fluoro lower-alkyl and R$^1$ is a lower-alkyl which comprises reacting, by refluxing in an inert organic solvent forming an azeotropic mixture with water, a fluoro lower-alkyl carboxylic acid of the formula RCOOH, wherein R has the above meaning, with an alkylthiosemicarbazide of the formula H$_2$NNHCSNHR$^1$, wherein R$^1$ has the above meaning.

2. The process of claim 1 wherein RCOOH is trifluoroacetic acid.

3. The process of claim 1 wherein RCOOH is difluoroacetic acid.

4. The process of claim 1 wherein RCOOH is chlorodifluoroacetic acid.

5. The process of claim 1 wherein RCOOH is trifluoroacetic acid and the thiosemicarbazide is 4-methylthiosemicarbazide.

6. The process of claim 1 wherein RCOOH is difluoroacetic acid and the thiosemicarbazide is 4-methylthiosemicarbazide.

7. The process of claim 1 wherein RCOOH is chlorodifluoroacetic acid and the thiosemicarbazide is 4-methylthiosemicarbazide.

8. The process of claim 1 wherein the solvent is toluene.

9. The process of claim 1 wherein the solvent is xylene.

* * * * *